United States Patent
Cheng et al.

(10) Patent No.: US 11,320,928 B2
(45) Date of Patent: May 3, 2022

(54) ELECTRONIC CIRCUIT HAVING DISPLAY DRIVING FUNCTION, TOUCH SENSING FUNCTION AND FINGERPRINT SENSING FUNCTION

(71) Applicant: Novatek Microelectronics Corp., Hsinchu (TW)

(72) Inventors: Huan-Teng Cheng, Hsinchu (TW); Wei-Lun Shih, Hsinchu (TW); Huang-Chin Tang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/944,157

(22) Filed: Jul. 31, 2020

(65) Prior Publication Data

US 2021/0034189 A1  Feb. 4, 2021

Related U.S. Application Data

(60) Provisional application No. 62/924,671, filed on Oct. 22, 2019, provisional application No. 62/898,551, (Continued)

(51) Int. Cl.
*G06F 3/041* (2006.01)
*G06K 9/00* (2006.01)
(Continued)

(52) U.S. Cl.
CPC .......... *G06F 3/0416* (2013.01); *G06F 3/0412* (2013.01); *G06K 9/0002* (2013.01)

(58) Field of Classification Search
USPC ........................................ 345/173
See application file for complete search history.

(56) References Cited

U.S. PATENT DOCUMENTS

2016/0148037 A1* 5/2016 Baek .................. G06F 3/04166
345/174
2016/0350571 A1* 12/2016 Han .................. G06F 3/04164
(Continued)

FOREIGN PATENT DOCUMENTS

| CN | 104049848 | 9/2014 |
| CN | 105373269 | 3/2016 |
| TW | M572496 | 1/2019 |

OTHER PUBLICATIONS

"Office Action of Taiwan Counterpart Application", dated Jul. 6, 2021, p. 1-p. 25.

*Primary Examiner* — Chineyere D Wills-Burns
(74) *Attorney, Agent, or Firm* — JCIPRNET

(57) ABSTRACT

An electronic circuit is adapted to drive a display panel having touch sensors and fingerprint sensors. The electronic circuit includes a first circuit, a second circuit, a first switch circuit and a control circuit. The first circuit processes touch sensing signals from the touch sensors. The second circuit processes fingerprint sensing signals corresponding to a fingerprint from the fingerprint sensors. The first switch circuit includes a plurality of first terminals coupled to the first circuit and the second circuit and a plurality of second terminals configurable to be coupled to the display panel. The first switch circuit couples a part of the first terminals to the second terminals in a first time interval and couples the other part of the first terminals to the second terminals in a second time interval. The touch sensing signals and the fingerprint sensing signals are inputted to the electronic circuit through the second terminals.

30 Claims, 13 Drawing Sheets

Related U.S. Application Data filed on Sep. 11, 2019, provisional application No. 62/881,912, filed on Aug. 1, 2019.

(51) Int. Cl.
*G06F 3/044* (2006.01)
*G09G 3/20* (2006.01)

(56) References Cited

U.S. PATENT DOCUMENTS

| | | | |
|---|---|---|---|
| 2017/0024602 A1* | 1/2017 | Han | G06F 3/0445 |
| 2017/0123555 A1* | 5/2017 | Kim | G06F 3/0412 |
| 2017/0336910 A1* | 11/2017 | Han | G06F 3/041661 |
| 2017/0344779 A1* | 11/2017 | Yoon | G06F 3/04166 |
| 2017/0344787 A1* | 11/2017 | Cho | G06F 3/0443 |
| 2018/0088715 A1* | 3/2018 | Lee | G06F 3/0412 |
| 2018/0113558 A1* | 4/2018 | Cho | G06F 3/0446 |
| 2018/0164943 A1* | 6/2018 | Hung | G06F 3/04166 |
| 2018/0349667 A1* | 12/2018 | Kim | G06K 9/0002 |
| 2019/0228139 A1 | 7/2019 | Oh et al. | |

* cited by examiner

ELECTRONIC CIRCUIT HAVING DISPLAY DRIVING FUNCTION, TOUCH SENSING FUNCTION AND FINGERPRINT SENSING FUNCTION

CROSS-REFERENCE TO RELATED APPLICATION

This application claims the priority benefit of U.S. Provisional application Ser. No. 62/881,912, filed on Aug. 1, 2019, U.S. Provisional application Ser. No. 62/898,551, filed on Sep. 11, 2019, and U.S. Provisional application Ser. No. 62/924,671, filed on Oct. 22, 2019. The entirety of the above-mentioned patent application is hereby incorporated by reference herein and made a part of this specification.

BACKGROUND

Technical Field

The invention relates to an electronic circuit, an electronic device and a display panel, more specifically, to an electronic circuit adapted to drive a display panel including touch sensors and fingerprint sensors, and to an electronic device including the electronic circuit and the display panel.

Description of Related Art

In recent years, demands for fingerprint sensing have been gradually increased. In order to reduce a volume of an electronic device, a fingerprint sensing region may overlap with a display region of the electronic device. For example, an under-display fingerprint sensing technique is to embed fingerprint sensors to a display panel, and the fingerprint sensor may sense or capture a fingerprint image through the display panel. When a touch event such as a finger touch happens, a touch sensing circuit may report it to an application processor of the electronic device via a specified interface. Next, the application processor further controls a display driving circuit to drive the display panel to display image for fingerprint sensing. On the other hand, the application processor further controls a fingerprint sensing circuit to perform the fingerprint sensing operation. The fingerprint sensing circuit transmits sensing information to the application processor for fingerprint identification after the fingerprint sensing operation, and then the application processor completes the fingerprint identification according to the sensing information.

However, for an electronic circuit capable of driving a display panel to perform a display operation, a touch sensing operation and a fingerprint sensing operation, a plurality of I/O nodes and complex routing may be required between the electronic circuit and the display panel for signal transmission. The plurality of I/O nodes and complex routing would increase the width of the fan-out area corresponding to the electronic circuit and the frame border size of the display panel near the electronic circuit.

SUMMARY

The invention is directed to an electronic circuit, an electronic device and a display panel, where the width of the fan-out area corresponding to the electronic circuit and the frame border size of the display panel near the electronic circuit are small.

The invention provides an electronic circuit, adapted to drive a display panel having touch sensors and fingerprint sensors. The electronic circuit includes a first circuit, a second circuit, a first switch circuit and a control circuit. The first circuit is configured to process touch sensing signals corresponding to a touch event from the touch sensors. The second circuit is configured to process fingerprint sensing signals corresponding to a fingerprint from the fingerprint sensors. The first switch circuit includes a plurality of first terminals coupled to the first circuit and the second circuit and a plurality of second terminals configurable to be coupled to the display panel. The first switch circuit is configured to couple a part of the first terminals to the second terminals in a first time interval and couple the other part of the first terminals to the second terminals in a second time interval. The touch sensing signals and the fingerprint sensing signals are inputted to the electronic circuit through the second terminals.

The invention provides a display panel includes a plurality of touch sensors, a plurality of touch sensing lines, a plurality of fingerprint sensors, a plurality of fingerprint sensing lines and a switch circuit. The touch sensors are configured to sense a touch event and generate touch sensing signals corresponding to the touch event. The touch sensing lines are coupled to the touch sensors and configured to transmit the touch sensing signals. The fingerprint sensors are configured to generate fingerprint sensing signals corresponding to a fingerprint. The fingerprint sensing lines are coupled to the fingerprint sensors and configured to transmit the fingerprint sensing signals. The switch circuit includes a plurality of first terminals coupled to the fingerprint sensing lines and the touch sensing lines and a plurality of second terminals configurable to be coupled to an electronic circuit. The switch circuit is switched to transmit the touch sensing signals to the electronic circuit in a first time interval. The switch circuit is switched to transmit the fingerprint sensing signals to the electronic circuit in a second time interval. The touch sensing signals and the fingerprint sensing signals are outputted from the display panel through the second terminals.

The invention provides a display device includes a display panel and an electronic circuit. The display panel has touch sensors and fingerprint sensors. The electronic circuit is configurable to be coupled to the display panel through a plurality of connection lines. The electronic circuit is adapted to receive touch sensing signals corresponding to a touch event from the touch sensors and receive fingerprint sensing signals corresponding to a fingerprint from the fingerprint sensors. The electronic circuit includes a first switch circuit. The electronic circuit generates control signals for controlling the first switch circuit, so as to receive the touch sensing signals from the touch sensors through the first switch circuit and the connection lines in a first time interval, and receive the fingerprint sensing signals from the fingerprint sensors through the first switch circuit and the connection lines in a second time interval.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
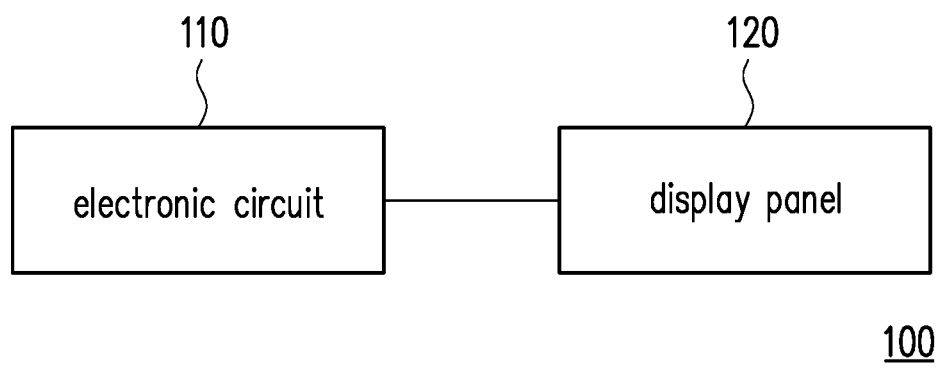
FIG. 1 is a schematic block diagram illustrating an electronic device according to an embodiment of the invention.

FIG. 1 is a schematic block diagram illustrating an electronic device according to an embodiment of the invention. Referring to FIG. 1, the electronic device 100 of the present embodiment includes an electronic circuit 110 and a display panel 120. The display panel 120 includes touch sensors and fingerprint sensors. The electronic circuit 110 is configurable to be coupled to the display panel 120. The electronic circuit 110 is adapted to drive the display panel 120.

In the present embodiment, the electronic device 100 may be an electronic device having a display function, a touch sensing function and a fingerprint sensing function. In an embodiment, the electronic device 100 may be, but not limited to, a smartphone, a non-smart phone, a wearable electronic device, a tablet computer, a personal digital assistant, a notebook and other portable electronic devices that can operate independently and have the display function, the touch sensing function and the fingerprint sensing function. In an embodiment, the electronic device 100 may be, but not limited to, a portable or un-portable electronic device in a vehicle intelligent system. In an embodiment, the electronic device 100 may be, but not limited to, intelligent home appliances such as, a television, a computer, a refrigerator, a washing machine, a telephone, an induction cooker, a table lamp and so on.

Figure 2:
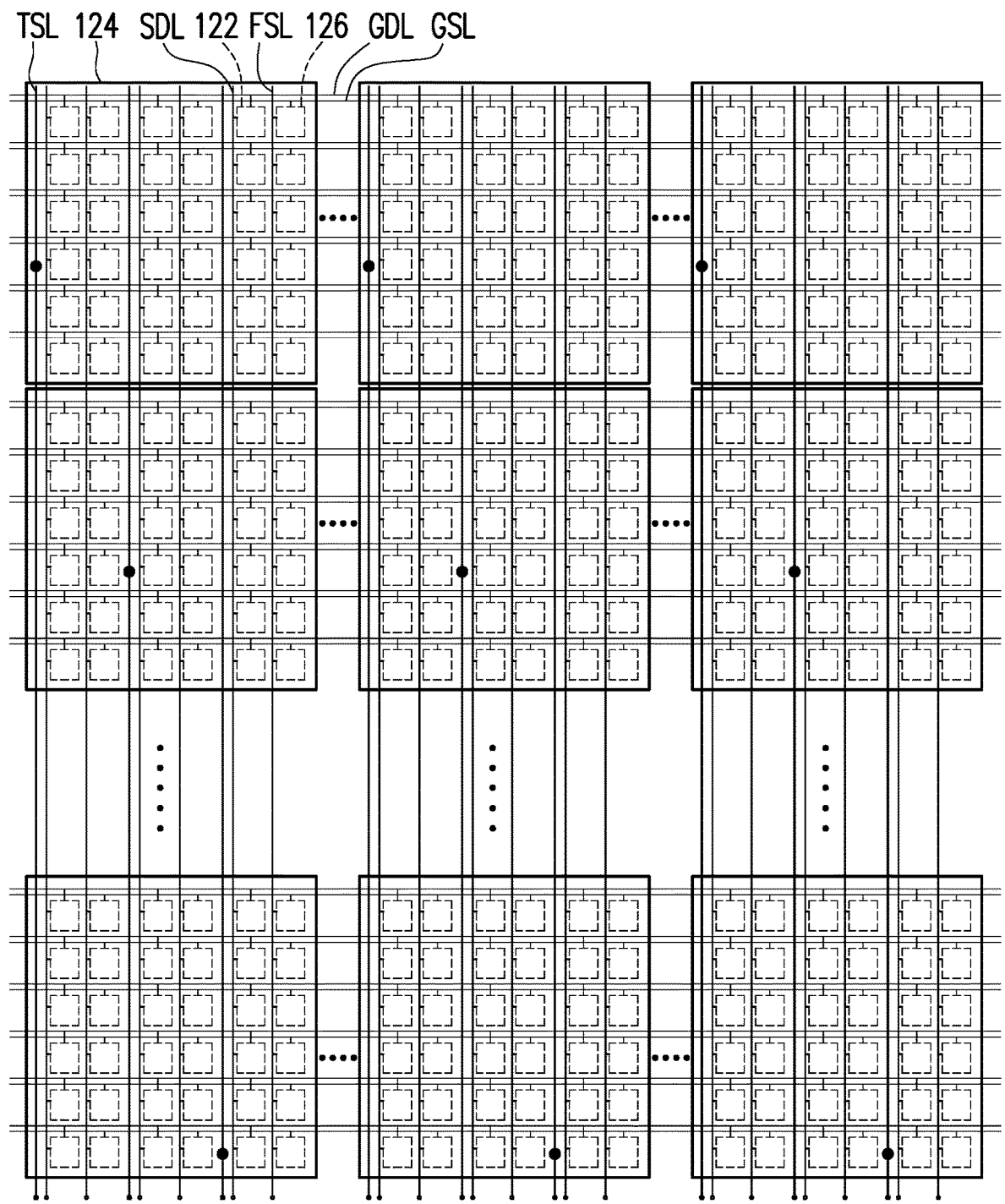
FIG. 2 is a schematic diagram illustrating the display panel depicted in FIG. 1.

FIG. 2 is a schematic diagram illustrating the display panel depicted in FIG. 1. Referring to FIG. 2, the display panel 120 of the present embodiment includes a plurality of display pixels 122, a plurality of touch sensors 124 and a plurality of fingerprint sensors 126. In an embodiment, each touch sensor may be formed by connecting a plurality of common electrodes which are provided with a display common voltage in a display phase. In another aspect, the touch sensors 124 may serve as common electrodes in the display phase. The electronic circuit 110 drives and controls the display panel 120 to perform a display operation, a touch sensing operation and a fingerprint sensing operation. To be specific, the electronic circuit 110 drives the display pixels 122 to display images via display scan lines GDL and display data lines SDL. Each display pixel 122 represents a pixel which is not a subpixel but a basic unit of a display resolution, such as a full-color pixel including R, G, B subpixels. Each display data line SDL represents a data line group including a plurality of data lines with respect to a display pixel. The display pixels 122 and the fingerprint sensors 126 depicted in FIG. 2 do not represent the actual location and merely illustrates that a fingerprint image resolution is same as a display resolution. The electronic circuit 110 also drives and controls the touch sensors 124 to sense a touch event of the display panel 120 via touch sensing lines TSL. For self-capacitance touch sensing, touch driving signals (or said touch excitation signal) and touch sensing signals may be both transmitted on the touch sensing lines TSL. For mutual-capacitance touch sensing, the display panel 120 may further include touch driving lines for transmitting the touch driving signals. The embodiments of the present disclosure are based on self-capacitance touch sensing. The electronic circuit 110 also generates control signals to a fingerprint scan circuit (not shown) on the display panel 120 for scanning the fingerprint sensors 126 and receive fingerprint sensing signals via fingerprint sensing lines FSL.

In an embodiment, the display panel 120 may be an in-cell fingerprint, touch and display panel that the fingerprint sensors and the touch sensors are embedded, but the invention is not limited thereto. In an embodiment, the fingerprint sensors 126 may be optical fingerprint sensors.

Figure 3:
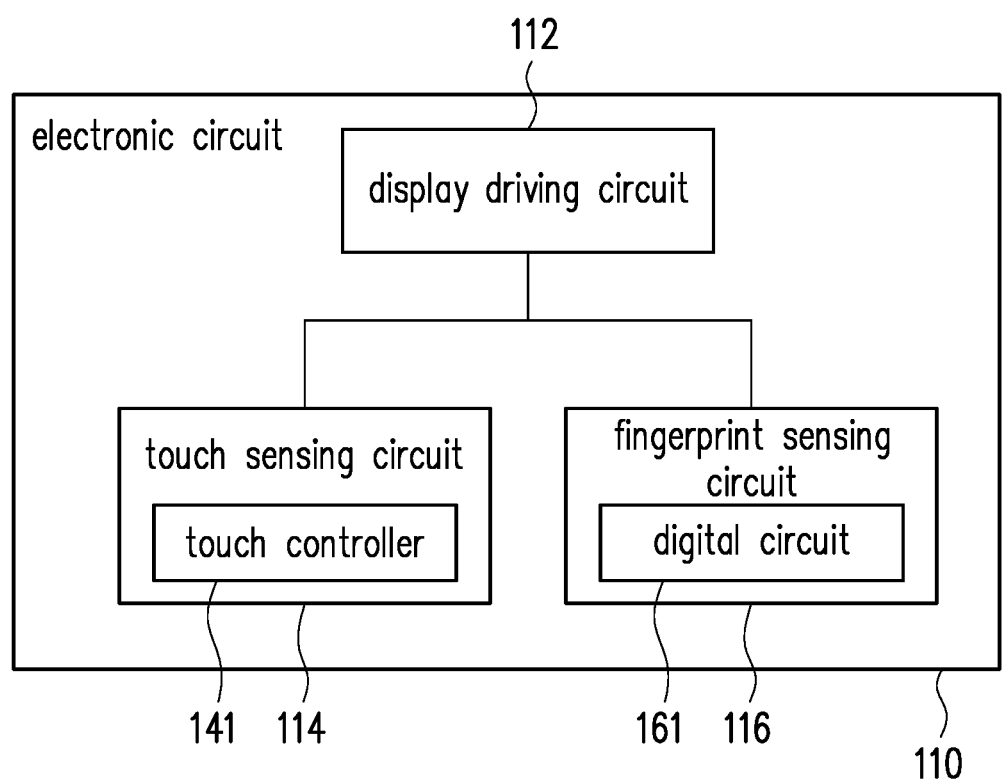
FIG. 3 is a schematic block diagram illustrating the electronic circuit depicted in FIG. 1.

FIG. 3 is a schematic block diagram illustrating the electronic circuit depicted in FIG. 1. Referring to FIG. 3, the electronic circuit 110 may include a display driving circuit 112, a touch sensing circuit 114 (a first circuit) and a fingerprint sensing circuit 116 (a second circuit). Also referred to FIG. 2, the display driving circuit 112 is configured to drive and control the display pixels 122 to display images via the display scan lines GDL and the display data lines SDL. The display driving circuit 112 generates display driving signals for driving the display pixels 122 through the display data lines SDL of the display panel 120. The display driving circuit 112 may include a timing controller, a display driver and other functional circuits for the display operation.

The touch sensing circuit 114 is configured to drive and control the touch sensors 124 to sense the touch event of the display panel 120 via the touch sensing lines TSL that connect to touch sensors 124. The touch sensing circuit 114 may include a touch controller 141 (a control circuit), an analog front end (AFE) circuit, an analog-to-digital converter (ADC) circuit and other functional circuits for the touch sensing operation. The fingerprint sensing circuit 116 is configured to generate control signals to the gate control circuit (not shown) on the display panel 120 for scanning the fingerprint sensors 126 via the fingerprint scan lines GSL and receives the fingerprint sensing signals via the fingerprint sensing lines FSL on the display panel 120. The fingerprint sensing circuit 116 receives fingerprint sensing signals corresponding to a fingerprint image from the fingerprint sensors 126 and processes the fingerprint sensing signals to obtain the fingerprint image. The fingerprint sensing circuit 116 may include a digital circuit 161, an AFE circuit, an ADC circuit and other functional circuits for the fingerprint sensing operation. In an embodiment, the electronic circuit 110 formed in a single semiconductor chip may have a control circuit including the timing controller and/or other digital circuit of the display driving circuit 112, the touch controller 141, and/or the digital circuit 161.

The display driving circuit 112, the touch sensing circuit 114 and the fingerprint sensing circuit 116 communicate with a core processor such as an application processor (AP) in a mobile device via different signal transmission interfaces, such as Mobile Industry Processor Interface (MIPI) (between the display driving circuit 112 and the core processor), Inter-Integrated Circuit (I2C) Interface (between the touch sensing circuit 114 and the core processor), and Serial Peripheral Interface (SPI) (between the fingerprint sensing circuit 116 and the core processor) and/or other similar or suitable interfaces. The operations of the display driving circuit 112 and the fingerprint sensing circuit 116 may be synchronized by a synchronization signal. The synchronization signal may be outputted from the display driving circuit 112 and/or the touch sensing circuit 114.

In an embodiment, the display driving circuit 112, the touch sensing circuit 114 and the fingerprint sensing circuit 116 may be formed in a single semiconductor chip or different semiconductor chips. For example, the display driving circuit 112, the touch sensing circuit 114 and the fingerprint sensing circuit 116 may be formed in a single semiconductor chip that can drive and control the display panel 120 to perform the display operation, the touch sensing operation and the fingerprint sensing operation. For another example, the display driving circuit 112 and the touch sensing circuit 114 may be formed in a first semiconductor chip that can drive and control the display panel 120 to perform the display operation and the touch sensing operation, and the fingerprint sensing circuit 116 may be formed in a second semiconductor chip which is different from the first semiconductor chip. The second semiconductor chip can drive and control the display panel 120 to perform the fingerprint sensing operation. For another example, the display driving circuit 112, the touch sensing circuit 114 and the fingerprint sensing circuit 116 may be formed in different semiconductor chips that can drive and control the display panel 120 to perform the display operation, the touch sensing operation and the fingerprint sensing operation, respectively.

Regarding hardware structures of the components in the embodiment of FIG. 3, the touch controller 141 and the digital circuit 161 may be a processor having computational capability. Alternatively, the touch controller 141 and the digital circuit 161 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC). In addition, enough teaching, suggestion, and implementation illustration for hardware structures of the display driving circuit 112, the touch sensing circuit 114 and the fingerprint sensing circuit 116 can be obtained with reference to common knowledge in the related art, which is not repeated hereinafter.

Figure 4:
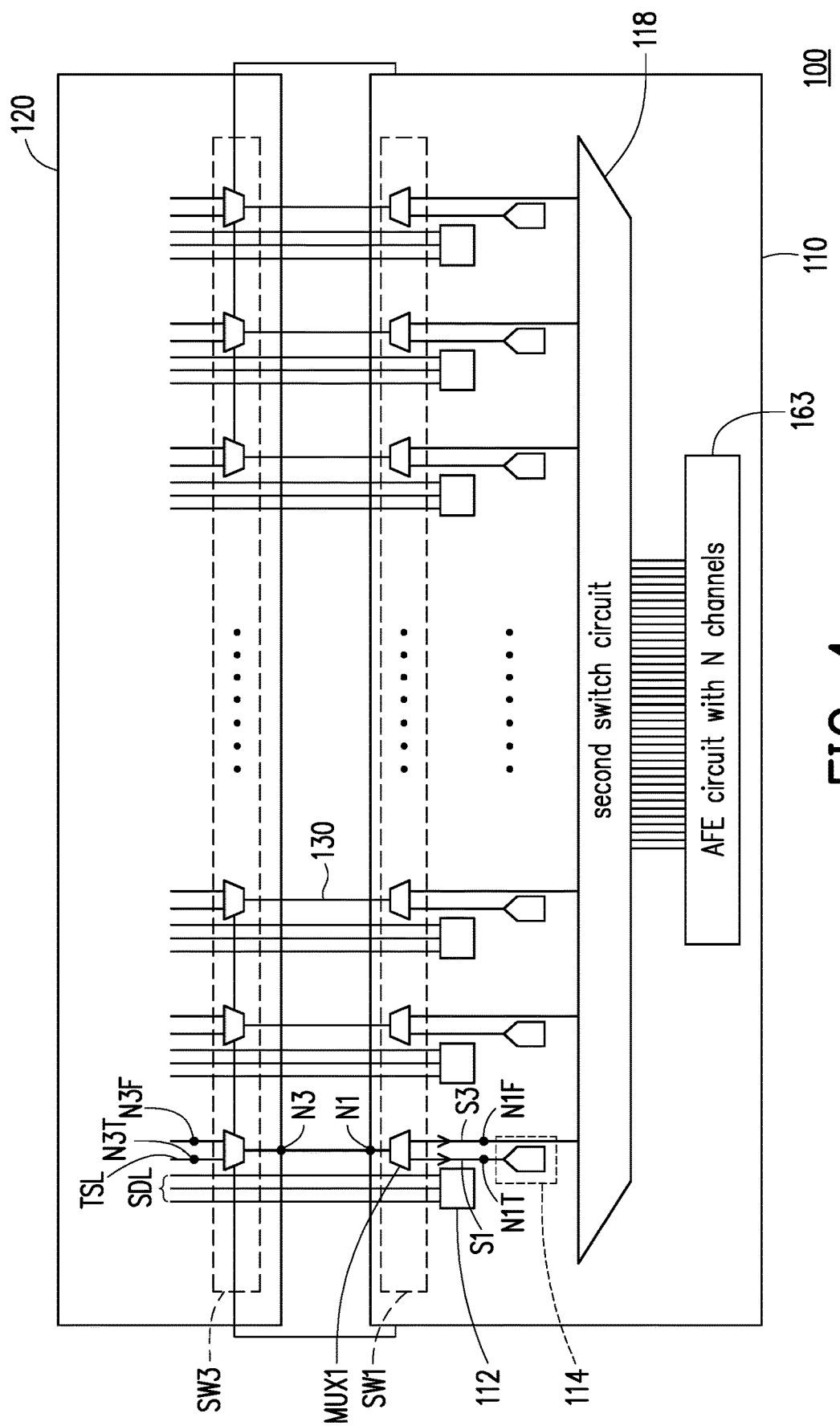
FIG. 4 is a schematic diagram illustrating a routing structure between the electronic circuit and the display panel according to an embodiment of the invention.

FIG. 4 is a schematic diagram illustrating a routing structure between the electronic circuit and the display panel according to an embodiment of the invention. Referring to FIG. 3 and FIG. 4, the electronic circuit 110 includes a switch circuit SW1 (a first switch circuit). The display panel 120 includes a switch circuit SW3 (a third switch circuit). The switch circuit SW1 is configurable to be coupled to the switch circuit SW3 via connection lines 130. In the present embodiment, the switch circuit SW1 is disposed in the electronic circuit 110, and the display panel 120 does not include the switch circuit SW1. Therefore, the frame border size of the display panel 120 near the electronic circuit 110 is reduced.

Figure 6A:
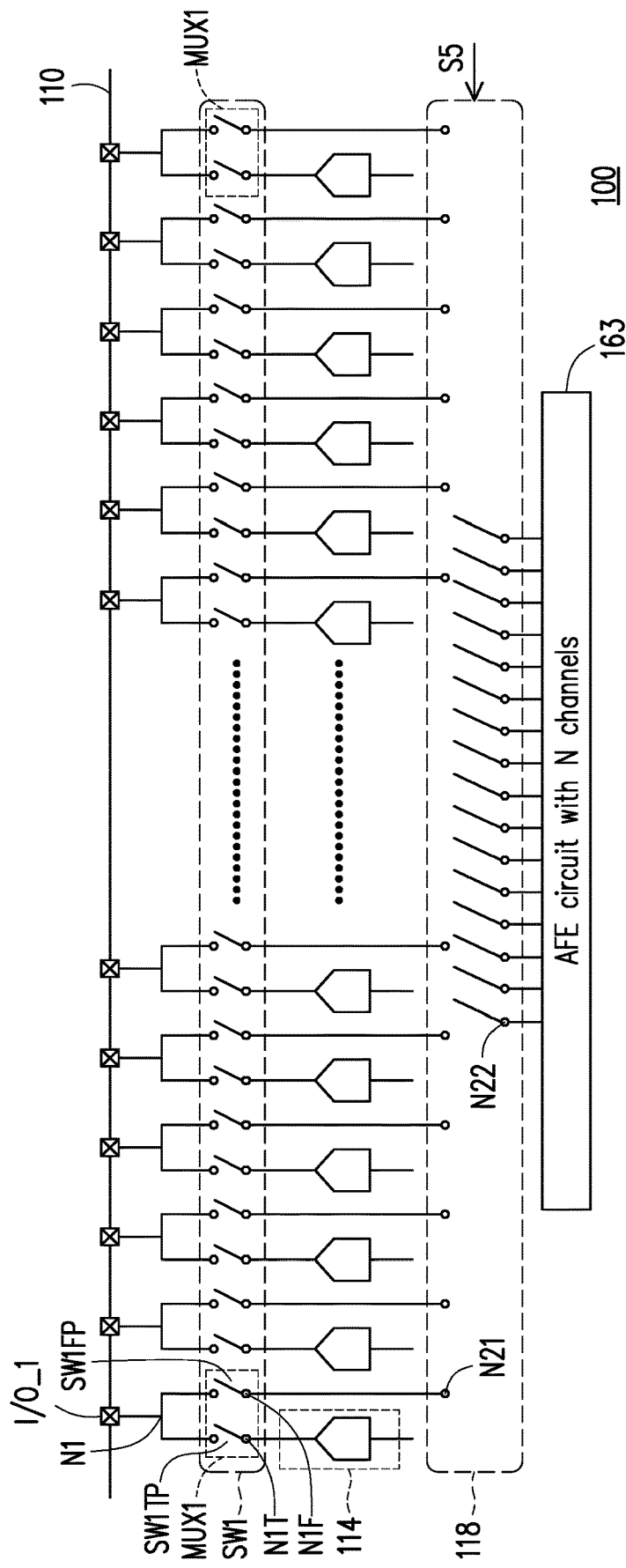
FIG. 6A is a schematic diagram illustrating detail structures of the first switch circuit and the second switch circuit according to an embodiment of the invention.

The switch circuit SW1 includes a plurality of first terminals N1T and N1F and a plurality of second terminals N1. The number of the first terminals N1T and N1F is larger than the number of the second terminals N1. The first terminals N1T are coupled to the touch sensing circuit 114. The touch sensing circuit 114 may output touch driving signals and/or receive touch sensing signals S1 through the second terminals N1 and the first terminals N1T. The first terminals N1F are coupled to an AFE circuit 163 of the fingerprint sensing circuit 116 via a switch circuit SW2 (a second switch circuit). The second terminals N1 is configurable to be coupled to the switch circuit SW3 of the display panel 120 via the connection lines 130. In the present embodiment, the switch circuit SW1 includes a plurality of multiplexers MUX1. Each of the multiplexers MUX1 includes a plurality of switch elements as illustrated in FIG. 6A, for example. The multiplexers MUX1 passes the received signal on the second terminal N1, which is the touch sensing signal S1 or the fingerprint sensing signal S3, to a selected one of the touch sensing circuit 114 and the fingerprint sensing circuit 116, through the respective first terminals N1T or N1F according to the control of the touch controller 141.

Figure 6B:
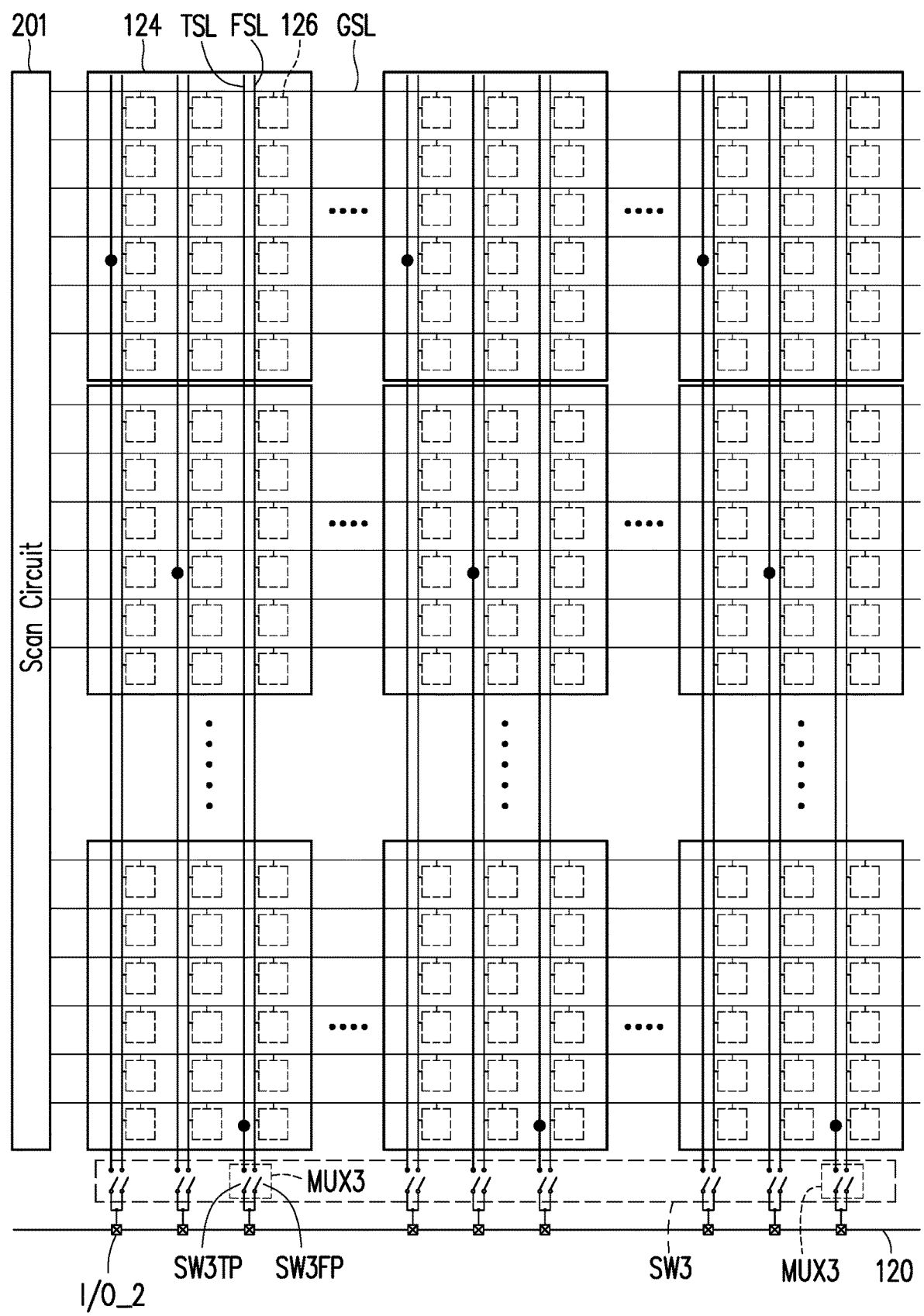
FIG. 6B is a schematic diagram illustrating a detail structure of the third switch circuit according to an embodiment of the invention.

The switch circuit SW3 includes a plurality of first terminals N3T and N3F and a plurality of second terminals N3. The number of the first terminals N3T and N3F is larger than the number of the second terminals N3. The first terminals N3T are coupled to the touch sensing lines TSL. The first terminals N3F are coupled to the fingerprint sensing lines FSL. The second terminals N3 are configurable to be coupled to the switch circuit SW1 of the electronic circuit 110 via the connection lines 130. In the present embodiment, the switch circuit SW3 includes a plurality of multiplexers MUX3. Each of the multiplexers MUX3 includes a plurality of switch elements as illustrated in FIG. 6B, for example. The multiplexer MUX3 selects one of the first terminals N3T and N3F to couple to the second terminal N3 such that a respective one of the touch sensing signal S1 and the fingerprint sensing signal S3 is passed to the electronic circuit 110 through the second terminal N3 according to the control of the touch controller 141.

In the present embodiment, the touch controller 141 is configured to generate control signals for controlling the switch circuits SW1 and SW3. For example, the touch controller 141 generates the control signals SW1TP and SW1FP to control corresponding switch elements of the switch circuit SW1, and generates the control signals SW3TP and SW3FP to control corresponding switch elements of the switch circuit SW3 as illustrated in FIG. 6A and FIG. 6B, for example.

Figure 5:
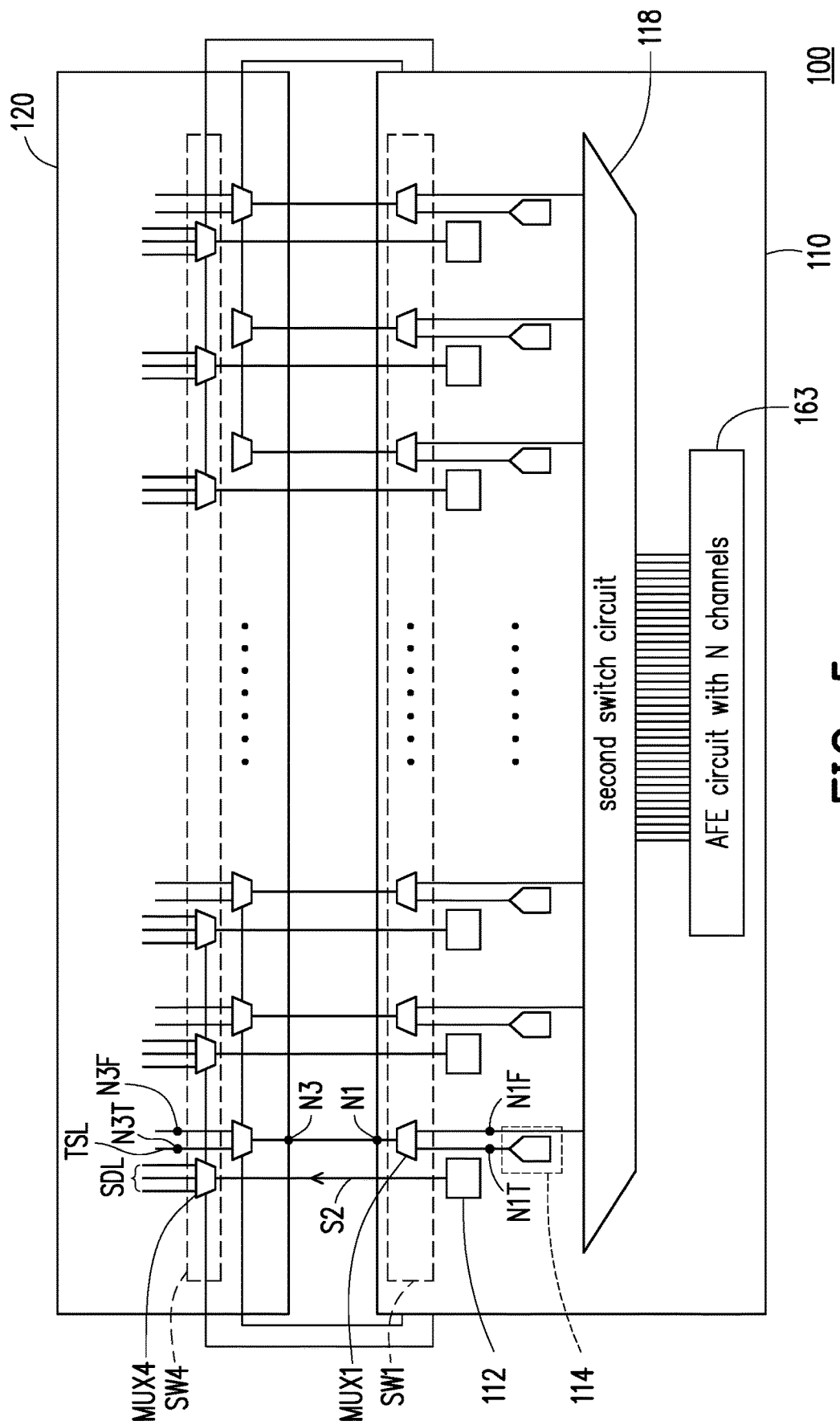
FIG. 5 is a schematic diagram illustrating a routing structure between the electronic circuit and the display panel according to another embodiment of the invention.

The display panel 120 may be an LCD panel or an OLED panel, which is not limited thereto. In the embodiment as illustrated in FIG. 4, the TFT backplane of the display panel 120 may be manufactured of amorphous silicon (a-Si). In the a-Si TFT backplane, there is no multiplexer placed between a data output terminal of the display driving circuit 112 and the data lines SDL of a pixel. FIG. 5 is a schematic diagram illustrating a routing structure between the electronic circuit and the display panel according to another embodiment of the invention. Referring to FIG. 5, the TFT backplane of the display panel 120 may be manufactured of Low-temperature polycrystalline silicon (LIPS). In the LIPS TFT backplane, there is a multiplexer MUX4 placed between a data output terminal of the display driving circuit 112 and the data lines SDL of a pixel. In the present embodiment, the display panel 120 includes a switch circuit SW4 (a fourth switch circuit). The switch circuit SW4 includes the plurality of multiplexers MUX4. Each of the multiplexers MUX4 includes a plurality of switch elements. Each of the multiplexers MUX4 passes the display driving signal S2 to a corresponding data line SDL through a selected one of switch elements of the multiplexers MUX4 according to the control of the touch controller 141 and/or the timing controller.

FIG. 6A is a schematic diagram illustrating detail structures of the first switch circuit and the second switch circuit according to an embodiment of the invention. FIG. 6B is a schematic diagram illustrating a detail structure of the third switch circuit according to an embodiment of the invention. Referring to FIG. 6A and FIG. 6B, the electronic circuit 110 is configurable to be coupled to the display panel 120 via the connection lines 130 and the respective nodes I/O_1 and I/O_2, e.g. I/O pin. The electronic circuit 110 receives the touch sensing signals S1 and the fingerprint sensing signal S3 from the display panel 120 via the same node I/O_1, and the display panel 120 outputs the touch sensing signals S1 and the fingerprint sensing signal S3 to the electronic circuit 110 via the same node I/O_2. For simplicity and clarity, display driving channels, display pixels, display data lines and display scan lines are not illustrated in FIG. 6A and FIG. 6B.

In a touch sensing phase (a first time interval), the control signal SW1TP turns on the corresponding switch elements of the switch circuit SW1 and the control signal SW1FP turns off the corresponding switch elements of the switch circuit SW1, and on the other hand, the control signal SW3TP turns on the corresponding switch elements of the switch circuit SW3 and the control signal SW3FP turns off the corresponding switch elements of the switch circuit SW3. The switch circuits SW1 and SW3 are switched to transmit the touch sensing signals S1 from the display panel 120 to the electronic circuit 110 in the touch sensing phase.

To be specific, the switch circuit SW3 includes a plurality of first switch elements controlled by the control signal SW3TP and a plurality of second switch elements controlled by the control signal SW3FP. The first switch elements and the second switch elements of the switch circuit SW3 are coupled between the respective first terminals N3T and N3F and the respective second terminals N3 as illustrated in FIG. 4 or FIG. 5. The first switch elements of the switch circuit SW3 are turned on and switched to transmit the touch sensing signals S1 to the electronic circuit 110 through the connection lines 130 in the touch sensing phase. The second switch elements of the switch circuit SW3 are turned off to make the fingerprint sensing lines FSL floating in the touch sensing phase. On the other hand, the switch circuit SW1 also includes a plurality of first switch elements controlled by the control signal SW1TP and a plurality of second switch elements controlled by the control signal SW1FP. The first switch elements and the second switch elements of the switch circuit SW1 are coupled between the respective first terminals N1T and the respective second terminals N1 as illustrated in FIG. 4 or FIG. 5. The first switch elements of the switch circuit SW1 are turned on and switched to receive the touch sensing signals S1 from the display panel 120 through the connection lines 130 in the touch sensing phase. The second switch elements of the switch circuit SW1 are turned off in the touch sensing phase.

Therefore, the touch sensing signals S1 are outputted from the display panel 120 to the electronic circuit 110 via the connection lines 130 and the switch circuits SW1 and SW3. That is to say, the touch controller 141 generates the control signals SW1TP, SW3TP, SW1FP, SW3FP, for controlling the switch circuits SW1 and SW3, so as to control the electronic circuit 110 to transmit the touch sensing signals S1 from the touch sensors 124 through the switch circuits SW1 and SW3 to the touch sensing circuit 114 in the touch sensing phase.

In the present embodiment, the second switch elements of the switch circuit SW3 controlled by the control signals SW3FP are turned off to make the fingerprint sensing lines FSL floating in the touch sensing phase, but the invention is not limited thereto. In an embodiment, the second switch elements of the switch circuit SW3 may be switched to transmit a signal having the same phase, frequency and amplitude as that of a touch driving signal to the fingerprint sensing lines FSL in the touch sensing phase. Since the fingerprint sensing lines FSL are driven by the signal that has the same phase, frequency and amplitude as that of the touch driving signal when the touch sensing operation is performed, parasitic capacitance affecting touch sensing signals is reduced.

In a fingerprint sensing phase (a second time interval), the control signal SW1TP turns off the corresponding switch elements of the switch circuit SW1 and the control signal SW1FP turns on the corresponding switch elements of the switch circuit SW1, and on the other hand, the control signal SW3TP turns off the corresponding switch elements of the switch circuit SW3 and the control signal SW3FP turns on the corresponding switch elements of the switch circuit SW3. The switch circuits SW1 and SW3 are switched to transmit the fingerprint sensing signal S3 from the display panel 120 to the electronic circuit 110 in the fingerprint sensing phase.

To be specific, the switch circuit SW3 includes a plurality of first switch elements controlled by the control signal SW3TP and a plurality of second switch elements controlled by the control signal SW3FP. The first switch elements and the second switch elements of the switch circuit SW3 are coupled between the respective first terminals N3T and N3F and the respective second terminals N3 as illustrated in FIG. 4 or FIG. 5. The first switch elements of the switch circuit SW3 are turned off in the fingerprint sensing phase. The second switch elements of the switch circuit SW3 are turned on and switched to transmit the fingerprint sensing signal S3 to the electronic circuit 110 through the connection lines 130 in the fingerprint sensing phase. On the other hand, the switch circuit SW1 also includes a plurality of first switch elements controlled by the control signal SW1TP and a plurality of second switch elements controlled by the control signal SW1FP. The first switch elements and the second switch elements of the switch circuit SW1 are coupled between the respective first terminals N1T and N1F and the respective second terminals N1 as illustrated in FIG. 4 or FIG. 5. The first switch elements of the switch circuit SW1 are turned off in the fingerprint sensing phase. The second switch elements of the switch circuit SW1 are turned on and switched to receive the fingerprint sensing signal S3 from the display panel 120 through the connection lines 130 in the fingerprint sensing phase.

Therefore, the fingerprint sensing signal S3 are outputted from the display panel 120 to the electronic circuit 110 via the connection lines 130 and the switch circuits SW1 and SW3. That is to say, the touch controller 141 generates the control signals SW1TP, SW3TP, SW1FP, SW3FP, for controlling the switch circuits SW1 and SW3, so as to control the electronic circuit 110 to transmit the fingerprint sensing signal S3 from the fingerprint sensors 126 through the switch circuits SW1 and SW3 to the fingerprint sensing circuit 116 in the fingerprint sensing phase.

In the present embodiment, the electronic circuit 110 includes a switch circuit 118 (a second switch circuit). The switch circuit 118 is coupled between the switch circuit SW1 and the AFE circuit 163 of the fingerprint sensing circuit 116.

The switch circuit 118 includes a plurality of third terminals N21 and fourth terminals N4. The number of the third terminals N21 is larger than the number of the fourth terminals N4. The third terminals N21 are coupled to the first terminals N1F of the switch circuit SW1, i.e. a part of the first terminals of the switch circuit SW1. The number of the third terminals N21 is smaller than the number of the first terminals N1T and N1F of the switch circuit SW1. On the other hand, the fourth terminals are coupled to the AFE circuit 163 of the fingerprint sensing circuit 116. The number of the fourth terminals N22 is equal to the number of the fingerprint sensing channel N of the AFE circuit 163, where N is a natural number. By the switch circuit 118, the AFE circuit 163 can process a smaller number of the fingerprint sensing signal S3 received from a selected number of the first terminals N1F, which are a part (not all) of the first terminals N1F.

The touch controller 141 generates the control signals SW1FP, SW1TP and S5 for controlling the switch circuit SW1 and the switch circuit 118, so as to control the electronic circuit 110 to receive the fingerprint sensing signals S3 from the fingerprint sensors 126 to the AFE circuit 163 through the switch circuit SW1 and the switch circuit 118 in the fingerprint sensing phase. In the fingerprint sensing phase, the control signal SW1FP turns on the corresponding switch elements of the switch circuit SW1, and the control signal SW1TP turns off the corresponding switch elements of the switch circuit SW1. The first terminal N1F is connected to the second terminal N1 in the switch circuit SW1. The control signal SW1TP turns off the corresponding switch elements of the switch circuit SW1. The electronic circuit 110 receives the fingerprint sensing signals S3 from the fingerprint sensors 126 through the switch circuit SW1 and the switch circuit 118.

In the present embodiment, as illustrated in FIG. 6B, the display panel 120 includes at least one scan circuit 201 (a gate control circuit). The scan circuit 201 is coupled to the fingerprint sensors 126 via the fingerprint scan lines GSL.

The scan circuit 201 is configured to initiate a fingerprint scanning to a fingerprint sensing zone via the corresponding fingerprint scan lines GSL, so as to control the fingerprint sensors 126 of the fingerprint sensing zone to perform the fingerprint sensing operation.

Figure 7:
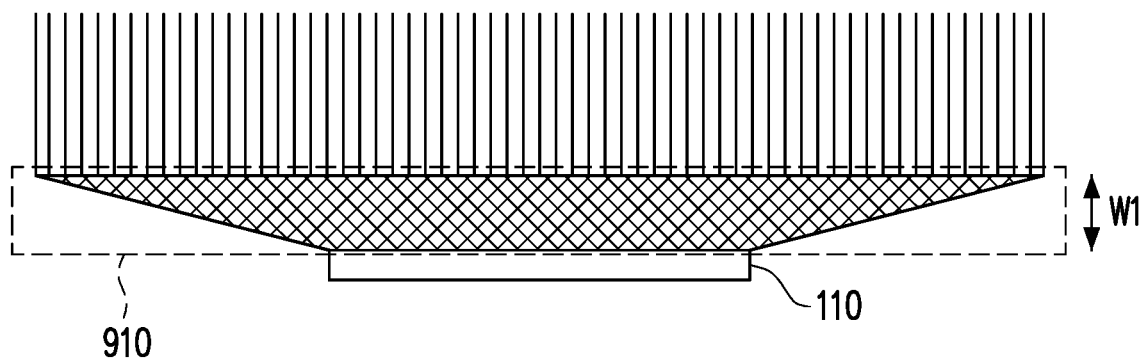
FIG. 7 is a schematic diagram illustrating a fan-out area corresponding to the electronic circuit according to an embodiment of the invention.
Figure 8:
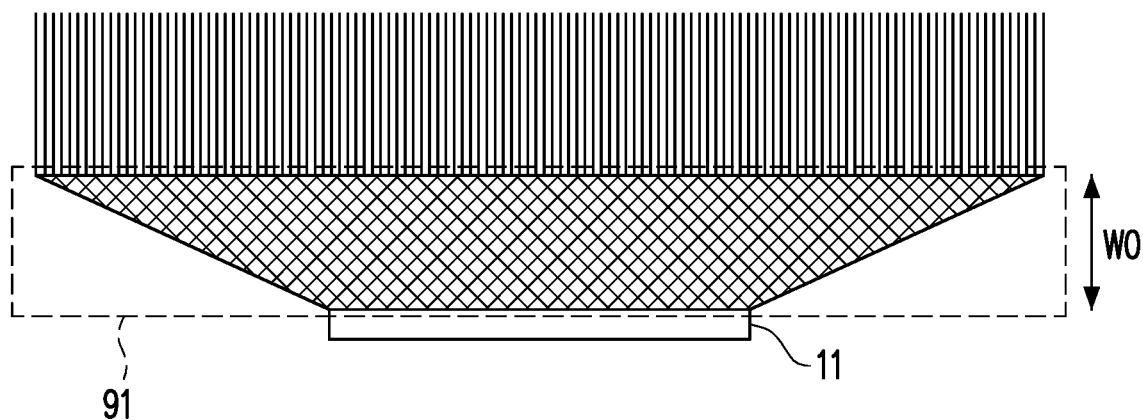
FIG. 8 is a schematic diagram illustrating a fan-out area corresponding to the electronic circuit in a related art.

FIG. 7 is a schematic diagram illustrating a fan-out area corresponding to the electronic circuit according to an embodiment of the invention. FIG. 8 is a schematic diagram illustrating a fan-out area corresponding to the electronic circuit in a related art. In the embodiment of FIG. 6A and FIG. 6B, the electronic circuit 110 receives the touch sensing signal S1 and the fingerprint sensing signal S3 from the display panel 120 via the same I/O node, e.g. I/O pin. The touch sensing signal S1 and the fingerprint sensing signal S3 are transmitted on the connection line 130 in different phases, and the connection lines 130 is shared by touch sensing signal S1 and the fingerprint sensing signal S3. The number of the I/O nodes is less, and the routing is simply between the electronic circuit 110 and the display panel 120. Therefore, the width W1 of the fan-out area 910 corresponding to the electronic circuit 110 is smaller than the width W0 of the fan-out area 91 corresponding to the electronic circuit 11. The frame border size of the display panel 120 near the electronic circuit 110 is reduced.

Figure 9:
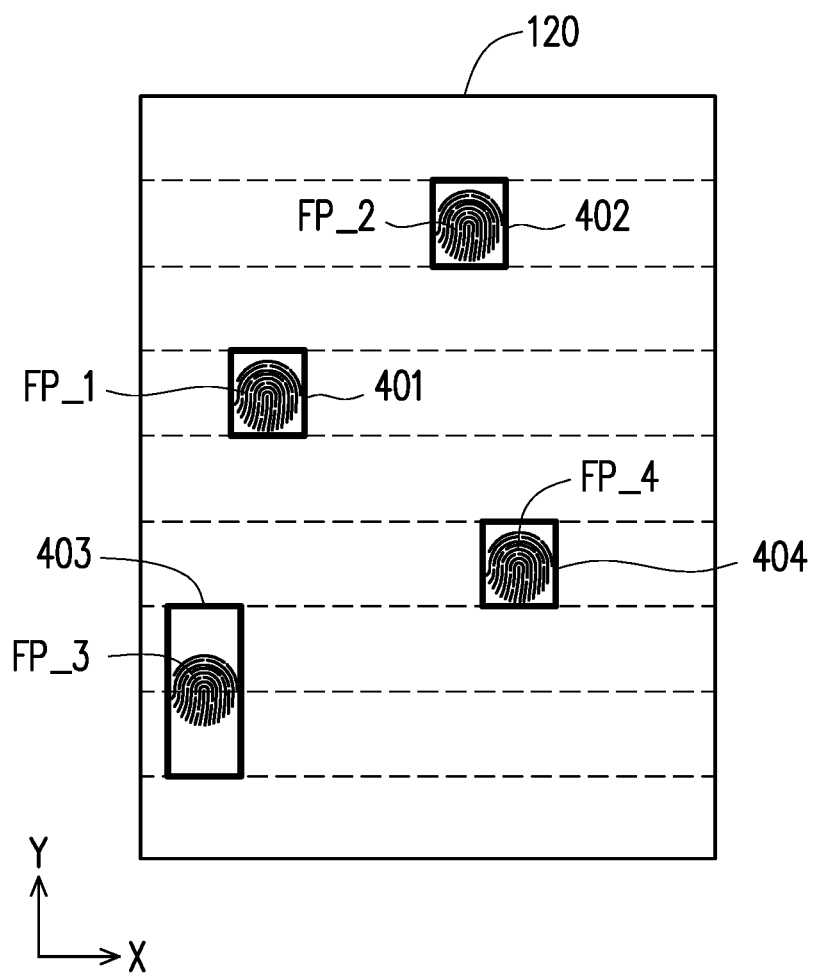
FIG. 9 is a schematic diagram illustrating a display panel operating for fingerprint sensing according to an embodiment of the invention.

FIG. 9 is a schematic diagram illustrating a display panel operating for fingerprint sensing according to an embodiment of the invention. Referring to FIG. 6A and FIG. 6B, the electronic circuit 110 may drive and control the display panel 120 to sense one or more fingerprint FP_1, FP_2, FP_3 and FP_4 on the display panel 120 at the same time for generating fingerprint images. In the present embodiment, the display panel 120 is not partitioned for fingerprint sensing in a direction that the fingerprint sensing lines FSL are arranged. Fingerprint sensing zones 401, 402, 403 and 404 can be flexibly formed for fingerprint sensing by selecting a part of the fingerprint sensing lines FSL among a plurality of the fingerprint sensing lines FSL arranged all over the display panel 120.

To be specific, the control circuit of the electronic circuit 110, which is not limited to the timing controller, the touch controller 114 or the digital circuit 161, may determine a touch coordinate information that indicates a center or near center location of a touch area corresponding to each of the fingerprint FP_1, FP_2, FP_3 and FP_4, based on touch sensing signals from the touch sensors 124, and the control circuit of the electronic circuit 110 further determine the fingerprint sensing zones 401, 402, 403 and 404 according to the touch coordinate information respectively corresponding to the fingerprint FP_1, FP_2, FP_3 and FP_4. Alternatively, the control circuit of the electronic circuit 110 may simply determine the touch coordinate information corresponding to the fingerprint FP_1, FP_2, FP_3 and FP_4 and report the coordinate information to the core processor, and the core processor may determine the size and location of the fingerprint sensing zones 401, 402, 403 and 404 and control the electronic circuit 110 based on related information. As such, the control circuit of the electronic circuit 110 may be capable of controlling the switch circuit SW1 to receive fingerprint sensing signals S3 from fingerprint sensing lines FSL within the fingerprint sensing zones 401, 402, 403 and 404.

In detail, the control circuit of the electronic circuit 110 controls the switch circuit 118 to select a part of the fingerprint sensing lines FSL for the fingerprint sensing operation according to the determined fingerprint sensing zones 401, 402, 403 and 404. The switch elements of the switch circuit 118 corresponding to the selected fingerprint sensing lines FSL are conducted. The fingerprint sensing signal S3 from the fingerprint sensors 126 is transmitted to the AFE circuit 163 via the selected fingerprint sensing lines FSL. In other words, by controlling the switch circuit 118, the part of the fingerprint sensing lines FSL within the fingerprint sensing zones 401, 402, 403 and 404 on the display panel 120 is selected among a plurality of the fingerprint sensing lines FSL arranged all over the display panel 120. In the present embodiment, the selected part of fingerprint sensing lines FSL may flexibly form a single fingerprint sensing zone 401, 402, 403 or 404 having a range determined by the touch coordination information corresponding to the fingerprint, such that only a single-turn receiving of fingerprint sensing signals is required. It is thus to solve a problem of receiving the fingerprint sensing signals corresponding to a fingerprint from two or more fixed fingerprint sensing zones in the horizontal direction. The time for fingerprint sensing is thus reduced.

Figure 10:
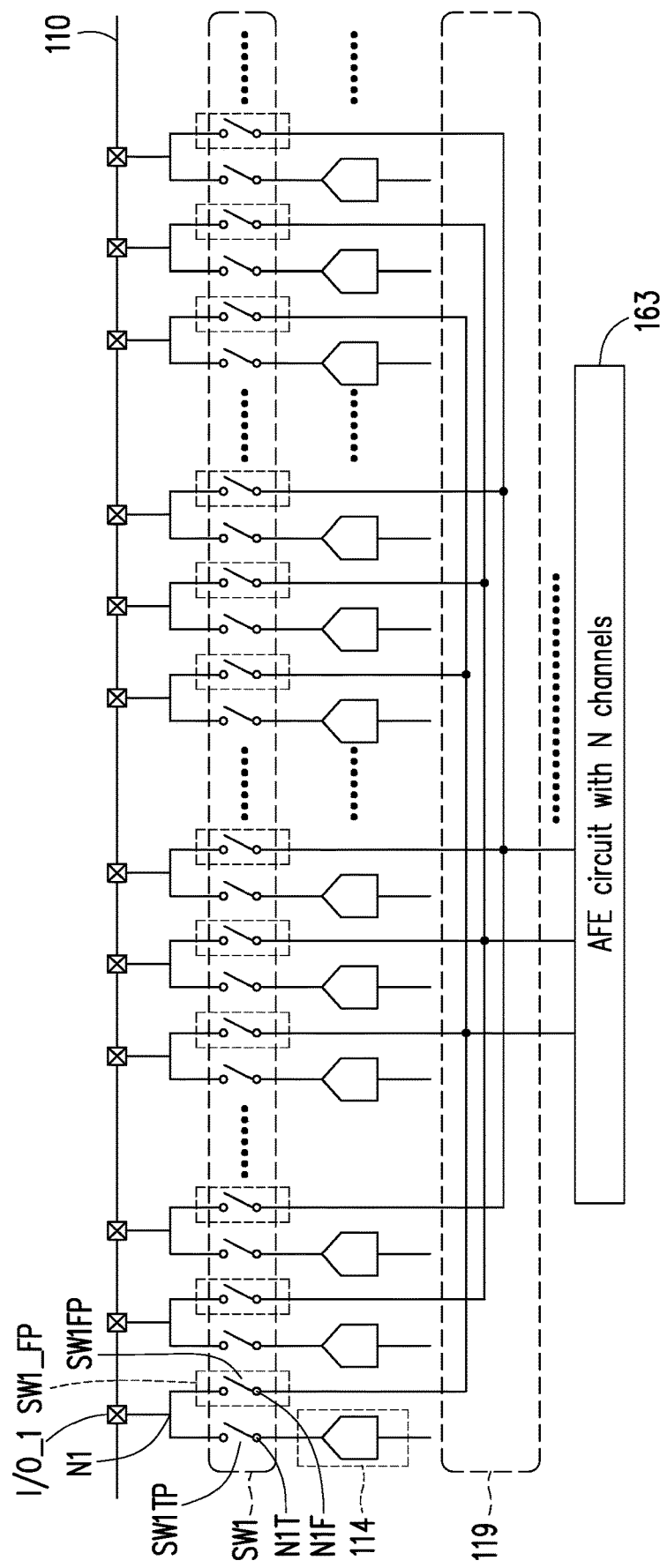
FIG. 10 is a schematic diagram illustrating a routing structure of the electronic circuit according to an embodiment of the invention.

FIG. 10 is a schematic diagram illustrating a routing structure of the electronic circuit according to an embodiment of the invention. Referring to FIG. 10, the electronic circuit 110 includes a wire circuit 119. The wire circuit 119 is coupled between the switch circuit SW1 and the AFE circuit 163 of the fingerprint sensing circuit 116. The wire circuit 119 may short-circuit a group of first terminals N1F. The switch circuit SW1 includes a plurality of switch elements SW1_FP and a plurality of first terminals N1F coupled to the switch elements SW1_FP. The first terminals N1F are divided into a plurality of groups and each group of the first terminals N1F are short-circuited by the wire circuit 119 and connected to the AFE circuit 163 through the wire circuit 119. The digital circuit 161 generates control signals SW1FP for controlling the switch elements SW1_FP. The switch elements SW1_FP can be independently controlled by the digital circuit 161. The digital circuit 161 determines which switch elements SW1_FP to be turned on or turned off according to one or more fingerprint sensing zones. The switch elements SW1_FP that are turned on establish the coupling between the fingerprint sensing lines FSL and the fingerprint sensing channels of the AFE circuit 163 for the fingerprint sensing operation. In another embodiment, not the digital circuit 161 but the control circuit of the electronic circuit 110 controls the switch elements SW1_FP, wherein the control circuit of the electronic circuit 110 is not limited to the timing controller, the touch controller 114 or the digital circuit 161.

In the present embodiment, the wire circuit 119 is coupled between the switch circuit 118 and the AFE circuit 163 for reducing the circuit area. The wire circuit 119 groups the fingerprint sensing lines FSL into a plurality of groups, and the groups are correspondingly connected to the fingerprint sensing channels in the AFE circuit 163. For example, the AFE circuit 163 may be designed to have 200 fingerprint sensing channels, and the number of the fingerprint sensing lines FSL is 1000, which also means that the number of the first terminals N1F is 1000. The first fingerprint sensing line, the $201^{st}$ fingerprint sensing line, the $401^{st}$ fingerprint sensing line, the $601^{st}$ fingerprint sensing line and the $801^{st}$ fingerprint sensing line are connected to a first fingerprint sensing channel of the AFE circuit 163 through a first group of the first terminals N1F short circuited by the wire circuit 119, and the switch elements corresponding to the first group of the first terminals N1F are not turned on at the same time. Similarly, the second fingerprint sensing line, the $202^{nd}$ fingerprint sensing line, the $402^{nd}$ fingerprint sensing line, the $602^{th}$ fingerprint sensing line and the $802^{nd}$ fingerprint sensing line are connected to a second fingerprint sensing channel of the AFE circuit 163 through a second group of the first terminals N1F short circuited by the wire circuit 119, and the switch elements corresponding to the second group of the first terminals N1F are not turned on at the same time. The connection relationship of the rest fingerprint sensing lines and the rest fingerprint sensing channel can be deduced by analogy.

The number of the fingerprint sensing lines FSL, the number of the fingerprint sensing channels and the connection relationship of the fingerprint sensing lines FSL and the fingerprint sensing channels are disclosed for example, and the invention is not limited thereto.

Figure 11A:
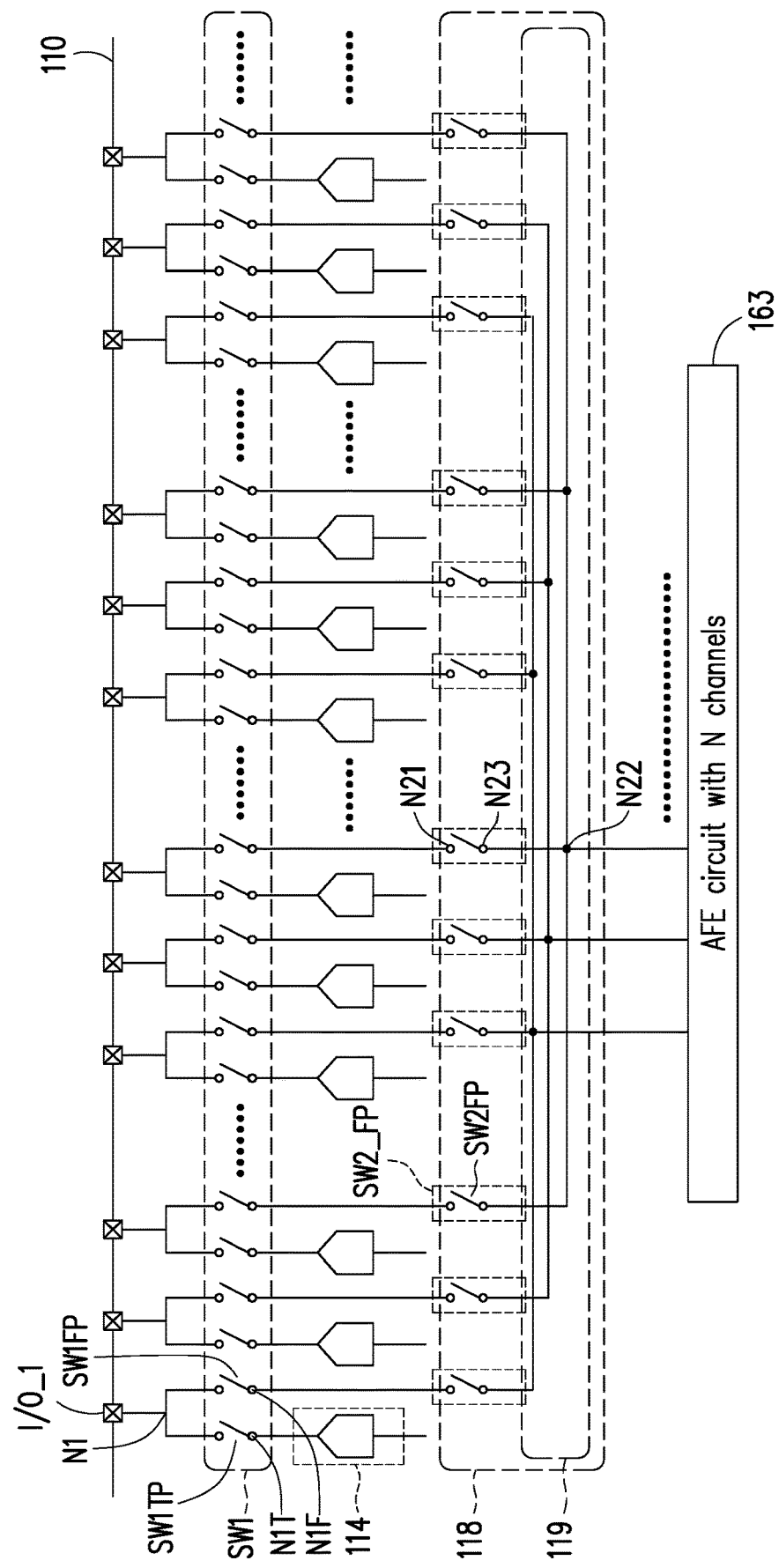
FIG. 11A is a schematic diagram illustrating a routing structure of the electronic circuit according to an embodiment of the invention.
Figure 11B:
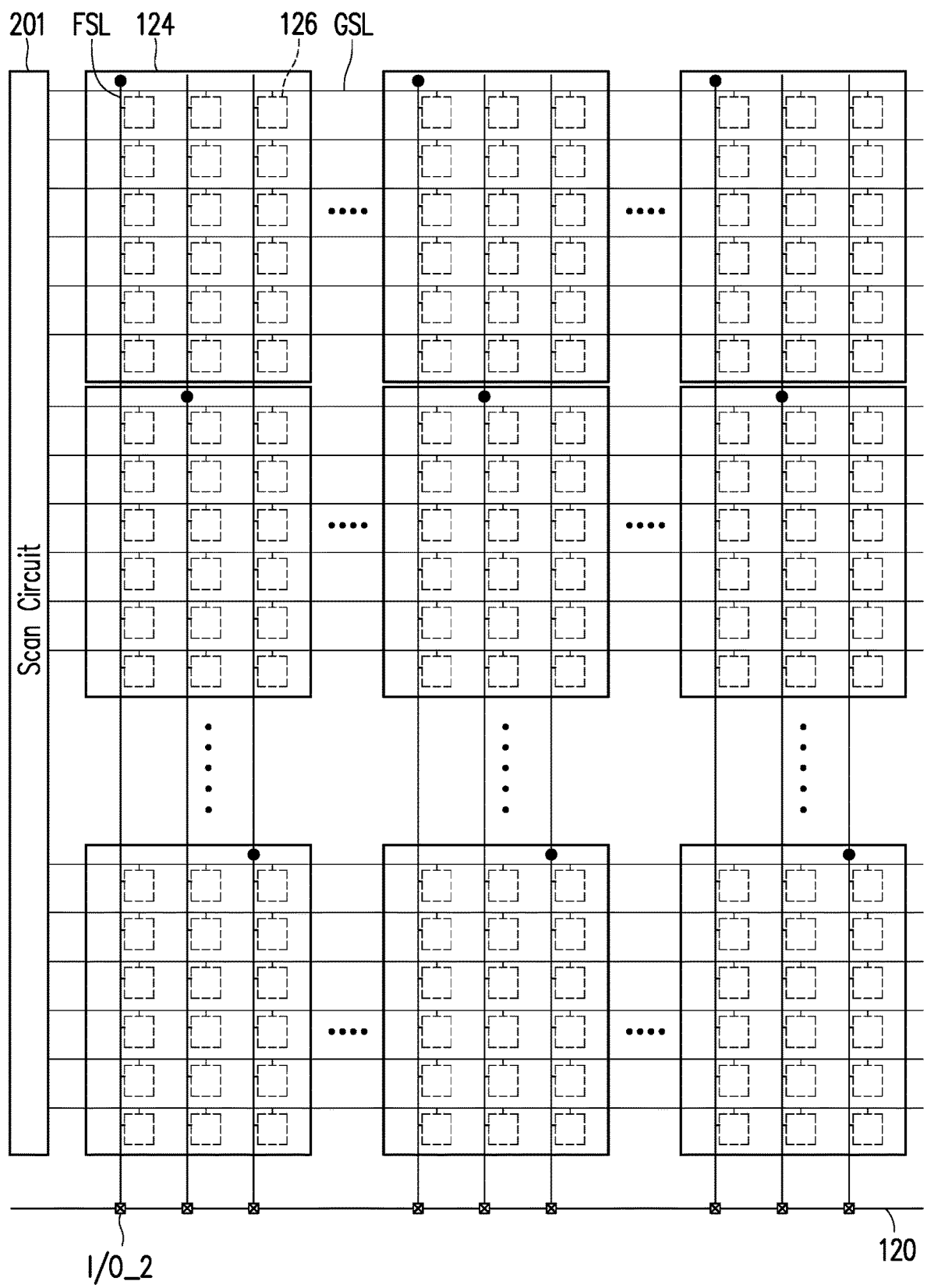
FIG. 11B is a schematic diagram illustrating the display panel according to another embodiment of the invention.

FIG. 11A is a schematic diagram illustrating a routing structure of the electronic circuit according to an embodiment of the invention. FIG. 11B is a schematic diagram illustrating the display panel according to another embodiment of the invention. Referring to FIG. 11A and FIG. 11B, the electronic circuit 110 is configurable to be coupled to the display panel 120 via the connection lines 130 and the respective nodes I/O_1 and I/O_2, e.g. I/O pin. The electronic circuit 110 receives the touch sensing signals S1 and the fingerprint sensing signal S3 from the display panel 120 via the same node I/O_1, and the display panel 120 outputs the touch sensing signals S1 and the fingerprint sensing signal S3 to the electronic circuit 110 via the same node I/O_2. For simplicity and clarity, display driving channels, display pixels, display data lines and display scan lines are not illustrated in FIG. 11A and FIG. 11B.

In the present embodiment, in the display panel 120, the touch sensing signal and the fingerprint sensing signal are transmitted on the same sensing line FSL in different phases. The number of the sensing lines are reduced to increase light transmittance of the display panel 120. In addition, the sensing line FSL is directly connected to the node I/O_2 without the switch circuit SW3. The frame border size of the display panel 120 near the electronic circuit 110 is reduced.

Referring to FIG. 10 and FIG. 11A, the electronic circuit 110 of the present embodiment is similar to that of the electronic circuit 110 depicted in FIG. 10, and the main difference therebetween, for example, lies in that the electronic circuit 110 of the present embodiment further includes the switch circuit 118. The switch circuit 118 including a plurality of switch elements SW2_FP and a wire circuit 119. One terminal of each switch element SW2_FP is denoted by N21, similar to the same terminal shown in FIG. 6A, and the other terminal of the switch element SW2_FP is denoted by N23. The terminals N23 of the switch elements SW2_FP are divided into a plurality of groups, and each group of the terminals N23 are short-circuited by the wire circuit 119 and connected to the AFE circuit 163 through the wire circuit 119.

The plurality of switch elements SW2_FP of the switch circuit 118 is coupled between the first terminals N1F of the switch circuit SW1 and the wire circuit 119. Each first terminals N1F is connected to a switch element SW2_FP. The digital circuit 161 generates control signals SW2FP for controlling the switch elements SW2_FP. The switch elements SW2_FP can be independently controlled by the digital circuit 161. The digital circuit 161 determines which switch elements SW2_FP to be turned on or turned off according to one or more determined fingerprint sensing zones. The switch elements SW2_FP that are turned on establish the coupling between the fingerprint sensing lines FSL and the fingerprint sensing channels for the fingerprint sensing operation. In another embodiment, not the digital circuit 161 but the control circuit of the electronic circuit 110 controls the switch elements SW2_FP, wherein the control circuit of the electronic circuit 110 is not limited to the timing controller, the touch controller 114 or the digital circuit 161.

In addition, the operation of the electronic circuit 110 described in the embodiment of the invention is sufficiently taught, suggested, and embodied in the embodiments illustrated in FIG. 9 and FIG. 10, and therefore no further description is provided herein.

Figure 12:
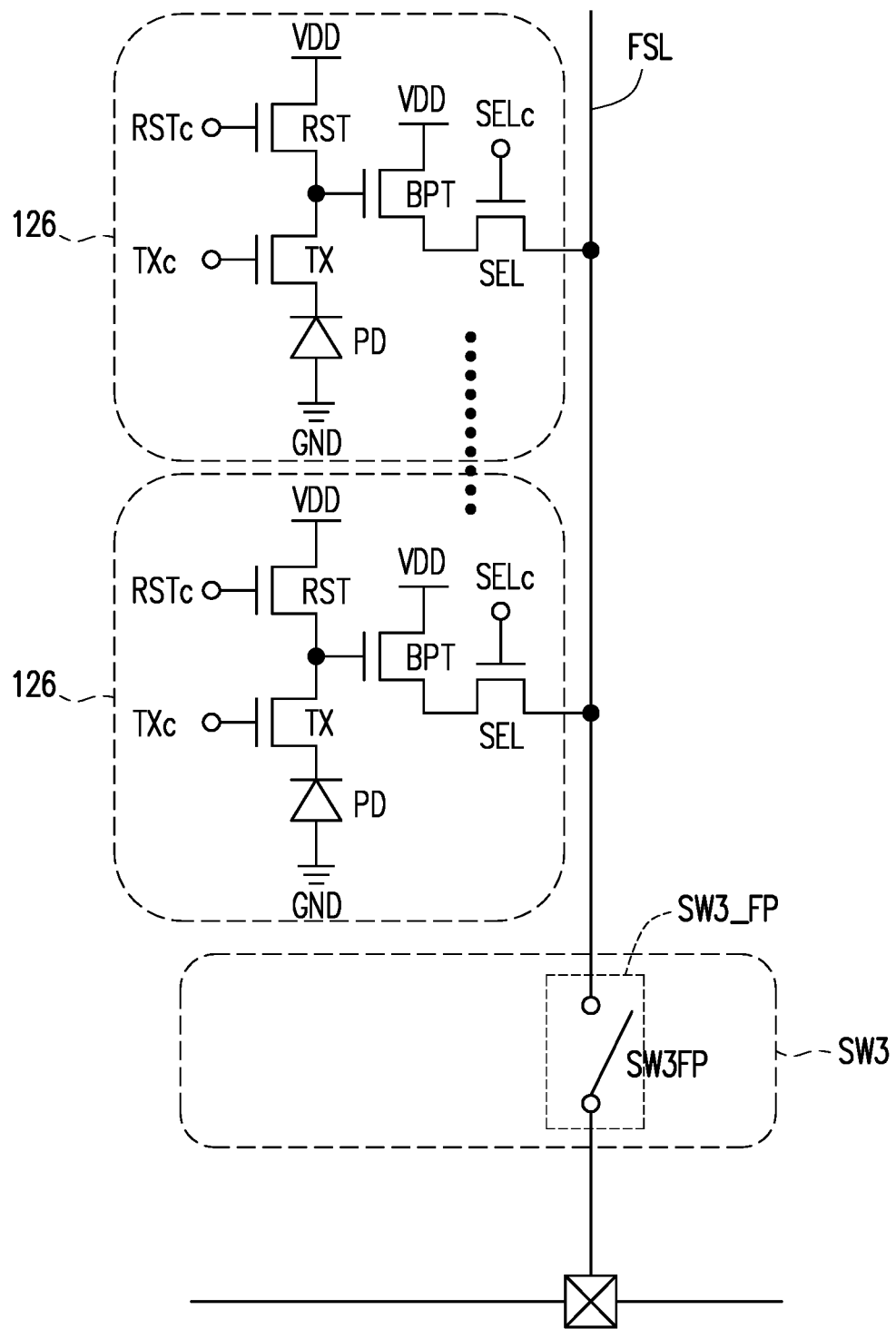
FIG. 12 is a schematic diagram illustrating a detail structure of the fingerprint sensor according to an embodiment of the invention.

FIG. 12 is a schematic diagram illustrating a detail structure of the fingerprint sensor according to an embodiment of the invention. Referring to FIG. 12, the fingerprint sensor 126 operates between system voltages VDD and GND. The fingerprint sensor 126 includes a photodiode PD, a reset transistor RST, a transfer transistor TX, a bypass transistor BPT and a row select transistor SEL. The gate terminals of the reset transistor RST, the transfer transistor TX and the row select transistor SEL are respectively controlled by control signals RSTc, TXc and SELc. These control signals are operated for fingerprint scan control and enabled only in the fingerprint sensing phase T2. In other words, the row select transistors SEL of the fingerprint sensors 126 are turned off in the touch sensing phase T3, such that the fingerprint sensing lines FSL are not driven by the fingerprint sensors 126. Therefore, the fingerprint sensors 126 do not affect conduction state of the fingerprint sensing lines FSL. This facilitates the control of the switch circuits SW1 and SW2 to transmit the synchronization signal S7 to the fingerprint sensing lines FSL in the touch sensing phase T3. In addition, enough teaching, suggestion, and implementation illustration for the operation of the fingerprint sensor 126 can be obtained with reference to common knowledge in the related art, which is not repeated hereinafter.

In summary, in the embodiments of the invention, the touch sensing signal and the fingerprint sensing signal are transmitted on the same connection line in different phases. The connection line is shared by the touch sensing signal and the fingerprint sensing signal. The electronic circuit receives the touch sensing signal and the fingerprint sensing signal from the display panel via the same pin connected to the connection line. The routing between the electronic circuit and the display panel is simplified. The width of the fan-out area corresponding to the electronic circuit and the frame border size of the display panel near the electronic circuit are reduced. For fingerprint sensing operation, the control circuit of the electronic circuit controls the switch circuit to select a part of the fingerprint sensing lines according to one or more fingerprint sensing zones determined based on the touch coordination information corresponding to one or more fingerprints. The selected fingerprint sensing lines may flexibly form a single fingerprint sensing zone having a range determined by the touch coordination information corresponding to the fingerprint to be sensed, such that only a single-turn receiving of fingerprint sensing signals is required. The time for fingerprint sensing is reduced. Therefore, the method for the fingerprint sensing and identification is more efficient, and users have good user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic circuit, adapted to drive a display panel having touch sensors and fingerprint sensors, the electronic circuit comprising:
   a first circuit, configured to output touch driving signals to the touch sensors of the display panel and process touch sensing signals corresponding to a touch event from the touch sensors;
   a second circuit, configured to process fingerprint sensing signals corresponding to a fingerprint from the fingerprint sensors;
   a first switch circuit, comprising a plurality of first terminals coupled to the first circuit and the second circuit and a plurality of second terminals configurable to be coupled to the display panel, and configured to couple a part of the first terminals to the second terminals in a first time interval and couple the other part of the first terminals to the second terminals in a second time interval, wherein the touch sensing signals and the fingerprint sensing signals are inputted to the electronic circuit through the second terminals and the touch driving signals are outputted to the touch sensors through the second terminals in the first time interval.

2. The electronic circuit of claim 1, further comprising:
   a control circuit, configured to generate a plurality of control signals for controlling the first switch circuit to couple the part of the first terminals to the second terminals in the first time interval and couple the other part of the first terminals to the second terminals in the second time interval.

3. The electronic circuit of claim 1, further comprising:
   a control circuit, configured to generate a plurality of control signals for controlling the first switch circuit, to make fingerprint sensing lines of the display panel floating through the first switch circuit in the first time interval.

4. The electronic circuit of claim 1, wherein the first time interval corresponds to a touch sensing phase, and the second time interval corresponds to a fingerprint sensing phase.

5. The electronic circuit of claim 1, wherein a number of the first terminals is larger than a number of the second terminals.

6. The electronic circuit of claim 1, further comprising:
   a second switch circuit, comprising a plurality of third terminals coupled to the other part of first terminals of the first switch circuit and a plurality of fourth terminals coupled to the second circuit, and configured to selectively couple a part of the third terminals to the fourth terminals in the second time interval, such that the fingerprint sensing signals from the fingerprint sensors are transmitted through the first switch circuit and the second switch circuit to the second circuit in the second time interval.

7. The electronic circuit of claim 6, wherein the second switch circuit further comprises: a plurality of switch elements, comprise a plurality of terminals; and
   a wire circuit, coupled between the plurality of terminals of the plurality of switch elements and the second switch circuit, wherein the plurality of terminals of are grouped into a plurality of terminal groups, and each of the terminal groups is shorted through the wire circuit and connected to the second circuit through the wire circuit.

8. The electronic circuit of claim 1, further comprising:
   a wire circuit, coupled between the second circuit and the first switch circuit, wherein the first switch circuit comprises a plurality of switch elements, and the switch elements are grouped into a plurality of groups and connected to the second circuit through the wire circuit.

9. The electronic circuit of claim 1, wherein
the input terminals of the first switch circuit is configurable to be coupled to a third switch circuit on the display panel that is coupled to the touch sensors and the fingerprint sensors through the fingerprint sensing lines and touch sensing lines on the display panel,
the first circuit receives the touch sensing signals corresponding to the touch event from the touch sensors through the third switch circuit on the display panel in the first time interval, and
the second circuit receives the fingerprint sensing signals corresponding to the fingerprint from the fingerprint sensors through the third switch circuit on the display panel in the second time interval.

10. The electronic circuit of claim 9, further comprising:
a control circuit, configured to generate a plurality of control signals for further controlling the third switch circuit, to make fingerprint sensing lines of the display panel floating through the first switch circuit and the third switch circuit in the first time interval.

11. A display panel, comprising:
a plurality of touch sensors, configured to sense a touch event and generate touch sensing signals corresponding to the touch event;
a plurality of touch sensing lines, coupled to the touch sensors and configured to receive touch driving signals and transmit the touch sensing signals;
a plurality of fingerprint sensors, configured to generate fingerprint sensing signals corresponding to a fingerprint;
a plurality of fingerprint sensing lines, coupled to the fingerprint sensors and configured to transmit the fingerprint sensing signals,
a switch circuit, comprising a plurality of first terminals coupled to the fingerprint sensing lines and the touch sensing lines, and a plurality of second terminals configurable to be coupled to an electronic circuit, wherein the switch circuit is switched to transmit the touch sensing signals to the electronic circuit in a first time interval, and the switch circuit is switched to transmit the fingerprint sensing signals to the electronic circuit in a second time interval, wherein the touch sensing signals and the fingerprint sensing signals are outputted from the display panel through the second terminals and the touch driving signals are received by the touch sensors through the second terminals in the first time interval.

12. The display panel of claim 11, wherein the switch circuit comprises:
a plurality of first switch elements coupled between the respective first terminals and the respective second terminals, and the first switch elements are switched to transmit the touch sensing signals to the electronic circuit in the first time interval.

13. The display panel of claim 12, wherein the switch circuit comprises:
a plurality of second switch elements coupled between the respective first terminals and the respective second terminals, and the second switch elements are switched to transmit the fingerprint sensing signals to the electronic circuit in the second time interval.

14. The display panel of claim 13, wherein the first time interval corresponds to a touch sensing phase, and the second time interval corresponds to a fingerprint sensing phase.

15. The display panel of claim 11, wherein the switch circuit is switched to make the fingerprint sensing lines floating in the first time interval.

16. The display panel of claim 11, wherein the switch circuit is switched to transmit a signal having the same phase, frequency and amplitude as that of the touch driving signal to the fingerprint sensing lines in the first time interval.

17. A display device, comprising:
a display panel having touch sensors and fingerprint sensors; and
an electronic circuit, configurable to be coupled to the display panel through a plurality of connection lines and adapted to output touch driving signals to the touch sensors of the display panel and receive touch sensing signals corresponding to a touch event from the touch sensors and receive fingerprint sensing signals corresponding to a fingerprint from the fingerprint sensors,
wherein the electronic circuit comprises a first switch circuit having a plurality of first terminals and a plurality of second terminals coupled to the display panel, and the electronic circuit generates control signals for controlling the first switch circuit, to
receive the touch sensing signals from the touch sensors through the first switch circuit and the connection lines in a first time interval, and
receive the fingerprint sensing signals from the fingerprint sensors through the first switch circuit and the connection lines in a second time interval,
wherein the touch driving signals are outputted to the touch sensors through the second terminals in the first time interval.

18. The display device of claim 17, wherein the first time interval corresponds to a touch sensing phase, and the second time interval corresponds to a fingerprint sensing phase.

19. The display device of claim 17, wherein the electronic circuit further comprising:
a first circuit, coupled to the first switch circuit and configured to process the touch sensing signals corresponding to the touch event from the touch sensors through the first switch circuit and the connection lines; and
a second circuit, coupled to the first switch circuit and configured to process the fingerprint sensing signals corresponding to the fingerprint from the fingerprint sensors through the first switch circuit and the connection lines, wherein the plurality of first terminals coupled to the first circuit and the second circuit and the first switch circuit configured to couple a part of the first terminals to the second terminals in a first time interval and couple the other part of the first terminals to the second terminals in a second time interval.

20. The display device of claim 19, wherein the electronic circuit further comprising:
a control circuit, configured to generate the control signals for controlling the first switch circuit to couple the part of the first terminals to the second terminals in the first time interval and couple the other part of the first terminals to the second terminals in the second time interval.

21. The display device of claim 19, wherein
the control circuit generates a plurality of control signals for controlling the first switch circuit, the first circuit and the second circuit, to make fingerprint sensing lines of the display panel floating through the first switch circuit in the first time interval.

22. The display device of claim 19, wherein a number of the first terminals is larger than a number of the second terminals.

23. The display device of claim 19, wherein the electronic circuit further comprises:
a second switch circuit, comprising a plurality of third terminals coupled to the other part of first terminals of the first switch circuit and a plurality of fourth terminals coupled to the second circuit, and configured to selectively couple a part of the third terminals to the fourth terminals in the second time interval, such that the fingerprint sensing signals from the fingerprint sensors are transmit through the first switch circuit and the second switch circuit to the second circuit in the second time interval.

24. The display device of claim 23, wherein the second switch circuit further comprises:
a plurality of switch elements, comprise a plurality of terminals; and
a wire circuit, coupled between the plurality of terminals of the plurality of switch elements and the second switch circuit, wherein the plurality of terminals of are grouped into a plurality of terminal groups, and each of the terminal groups is shorted through the wire circuit and connected to the second circuit through the wire circuit.

25. The display device of claim 19, wherein the electronic circuit further comprises:
a wire circuit, coupled between the second circuit and the first switch circuit, wherein the first switch circuit comprises a plurality of switch elements, and the switch elements are grouped into a plurality of groups and connected to the second circuit through the wire circuit.

26. The display device of claim 17, wherein the display panel comprises:
a plurality of touch sensors, configured to sense the touch event and generate the touch sensing signals corresponding to the touch event;
a plurality of touch sensing lines, coupled to the touch sensors and configured to transmit the touch sensing signals;
a plurality of the fingerprint sensors, configured to generate the fingerprint sensing signals corresponding to a fingerprint;
a plurality of fingerprint sensing lines, coupled to the fingerprint sensors and configured to transmit the fingerprint sensing signals,
a third switch circuit, comprising a plurality of first terminals coupled to the fingerprint sensing lines and the touch sensing lines and a plurality of second terminals configurable to be coupled to the electronic circuit through the connection lines,
wherein the third switch circuit is switched to transmit the touch sensing signals to the electronic circuit through the connection lines in the first time interval, and the third switch circuit is switched to transmit the fingerprint sensing signals to the electronic circuit through the connection lines in the second time interval.

27. The display device of claim 26, wherein the third switch circuit comprises:
a plurality of first switch elements coupled between the respective first terminals and the respective second terminals, and the first switch elements are switched to transmit the touch sensing signals to the electronic circuit through the connection lines in the first time interval.

28. The display device of claim 27, wherein the third switch circuit comprises:
a plurality of second switch elements coupled between the respective first terminals and the respective second terminals, and the second switch elements are switched to transmit the fingerprint sensing signals to the electronic circuit through the connection lines in the second time interval.

29. The display device of claim 26, wherein the third switch circuit is switched to make the fingerprint sensing lines floating in the first time interval.

30. The display device of claim 26, wherein the third switch circuit is switched to transmit a signal having the same phase, frequency and amplitude as that of the touch driving signal to the fingerprint sensing lines in the first time interval.

* * * * *